(12) United States Patent
Flockhart et al.

(10) Patent No.: US 8,634,541 B2
(45) Date of Patent: Jan. 21, 2014

(54) WORK ASSIGNMENT DEFERMENT DURING PERIODS OF AGENT SURPLUS

(75) Inventors: Andrew D. Flockhart, Thornton, CO (US); Robert C. Steiner, Broomfield, CO (US); Joylee Kohler, Northglenn, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/457,253

(22) Filed: Apr. 26, 2012

(65) Prior Publication Data

US 2013/0287202 A1 Oct. 31, 2013

(51) Int. Cl.
*H04M 3/00* (2006.01)
*H04M 5/00* (2006.01)

(52) U.S. Cl.
USPC ............. 379/265.12; 379/265.02; 379/265.13

(58) Field of Classification Search
USPC ............. 379/265.01, 265.02, 265.11, 265.12, 379/265.13
See application file for complete search history.

(56) References Cited

U.S. PATENT DOCUMENTS

| | | | |
|---|---|---|---|
| 6,163,607 A * | 12/2000 | Bogart et al. | 379/266.01 |
| 6,577,727 B1 * | 6/2003 | Hymel | 379/265.05 |
| 8,059,803 B1 * | 11/2011 | McDougal et al. | 379/201.01 |
| 2010/0235218 A1 | 9/2010 | Erhart et al. | |
| 2010/0296417 A1 | 11/2010 | Steiner | |
| 2011/0125793 A1 | 5/2011 | Erhart et al. | |
| 2011/0125826 A1 | 5/2011 | Erhart et al. | |
| 2011/0255683 A1 | 10/2011 | Flockhart et al. | |

* cited by examiner

*Primary Examiner* — Ahmad Matar
*Assistant Examiner* — Nafiz E Hoque
(74) *Attorney, Agent, or Firm* — Sheridan Ross (57) ABSTRACT

A contact center is described along with various methods and mechanisms for administering the same. The contact center proposed herein provides the ability to, among other things, support deferring work item routing decisions for a predetermined amount of time even when agents that are technically qualified to handle the work item are available. The deferment of work item routing decisions helps to achieve better matching and, therefore, increases contact center efficiency even though decisions are delayed.

18 Claims, 4 Drawing Sheets

WORK ASSIGNMENT DEFERMENT DURING PERIODS OF AGENT SURPLUS

FIELD OF THE DISCLOSURE

The present disclosure is generally directed toward communications and more specifically toward contact centers.

BACKGROUND

The work assignment logic in contact centers usually makes only a single routing decision for a contact at a single point in time. It is conventional wisdom that making a single routing decision on a work item results in the most efficient use of resources. The work assignment decision is, therefore, based on a single state of the contact center. This limits the work assignment logic from making perfect contact-to-agent assignments if the perfect agent is not currently available at the time when the assignment decision is made.

SUMMARY

It is with respect to the above issues and other problems that the embodiments presented herein were contemplated. In particular, embodiments of the present disclosure provide the ability to defer work assignment decisions in a contact center based on one or both of the following considerations: value-based deferment and skill-based deferment.

In a value-based deferment scheme the following process may be employed: (1) a service time goal (target time) is set for contacts in the contact center; (2) a first percentage of the target time is defined and expected losses are associated with that first percentage of the target time; (3) agents are split into at least two tiers (more tiers are possible) where a tier 1 agent is expected to earn a first amount for handling contacts of a certain type and a tier 2 agent is expected to earn a second amount (which is less than the first amount) for handling contacts of the same type; (4) the tiers may be based on agent skill, but do not necessarily have to be based on agent skill—rather, it can be based on actual Key Performance Indicators (KPIs) for the agents; and (5) a deferment rule is defined such that during periods of agent surplus (e.g., when tier 2 agents are available, but the tier 1 agents are not available) the work assignment decision is deferred for an amount of time equal to the actual wait time of the contact plus the first percentage unless a tier 1 agent becomes available. Prior to this amount of time elapsing, tier 2 agents are not considered eligible to receive the contact, even though the tier 2 agents are actually qualified to handle the contact. Accordingly, the work assignment decision is actually being processed but no agent-to-contact assignment decision is made because the tier 2 agents are not considered eligible. After the requisite amount of time has passed, the tier 2 agents become eligible and the best suited tier 2 agent among the available tier 2 agents is assigned to the contact (unless a tier 1 agent has become available in the meantime). This deferment scheme can be expanded to support more than two tiers of agents. In particular, up to N (where N is greater than or equal to 2) tiers of agents can be established along with up to N−1 incremental deferment stages. The example of two tiers and a single deferment decision will be described for ease of understanding the principles of the present disclosure.

In a skill-based deferment scheme the following process may be employed: (1) a service time goal (target time) is set for contacts in the contact center; (2) agents are split into at least two tiers (more tiers are possible) where a tier 1 agent is expected to process contacts of a certain type in a first amount of time and a tier 2 agent is expected to process contacts of the same type in a second amount of time (which is greater than the first amount of time by a delta time that is calculated based on expected losses for using a tier 2 agent as compared to a tier 1 agent to handle the contact); (3) the tiers may be based on agent skill, but do not necessarily have to be based on agent skill—rather, it can be based on actual KPIs for the agents; and (5) a deferment rule is defined such that during periods of agent surplus (e.g., when tier 2 agents are available, but the tier 1 agents are not available) the work assignment decision is deferred for an amount of time equal to the delta time unless a tier 1 agent becomes available. Prior to this amount of time elapsing, tier 2 agents are not considered eligible to receive the contact. Accordingly, the work assignment decision is actually being processed but no agent-to-contact assignment decision is made because the tier 2 agents are not considered eligible. After the delta time has passed, the tier 2 agents become eligible and the best suited tier 2 agent among the available tier 2 agents is assigned to the contact (unless a tier 1 agent has become available in the meantime).

The tiered approach described herein is much easier to implement than previously-available solutions. Specifically, the administrator only has to define a first percentage of target time (e.g., 1%, 5%, 7%, etc.) and that percentage can be applied across every skill or work type. Additionally, multiple tiers can be easily defined because the system administrator only has to define multiple percentages and define the routing rules that occur after a percentage-based threshold has been crossed. These rules can be defined across multiple skills for any type of agent rather than applying specific threshold rules for different types of agents at different skills.

In accordance with at least some embodiments of the present disclosure, a method is provided which generally comprises:

dividing a group of contact center agents into at least two tiers, the at least two tiers including a first tier and a second tier;

receiving a work item at a first time, wherein agents from the group of contact center agents are qualified to process the received work item;

determining that no first tier agent is available to receive the work item; and deferring a work assignment decision for the work item regardless of whether or not a second tier agent is available to receive the work item, wherein the work assignment decision is deferred until a second time that is a predetermined amount of time after the first time.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
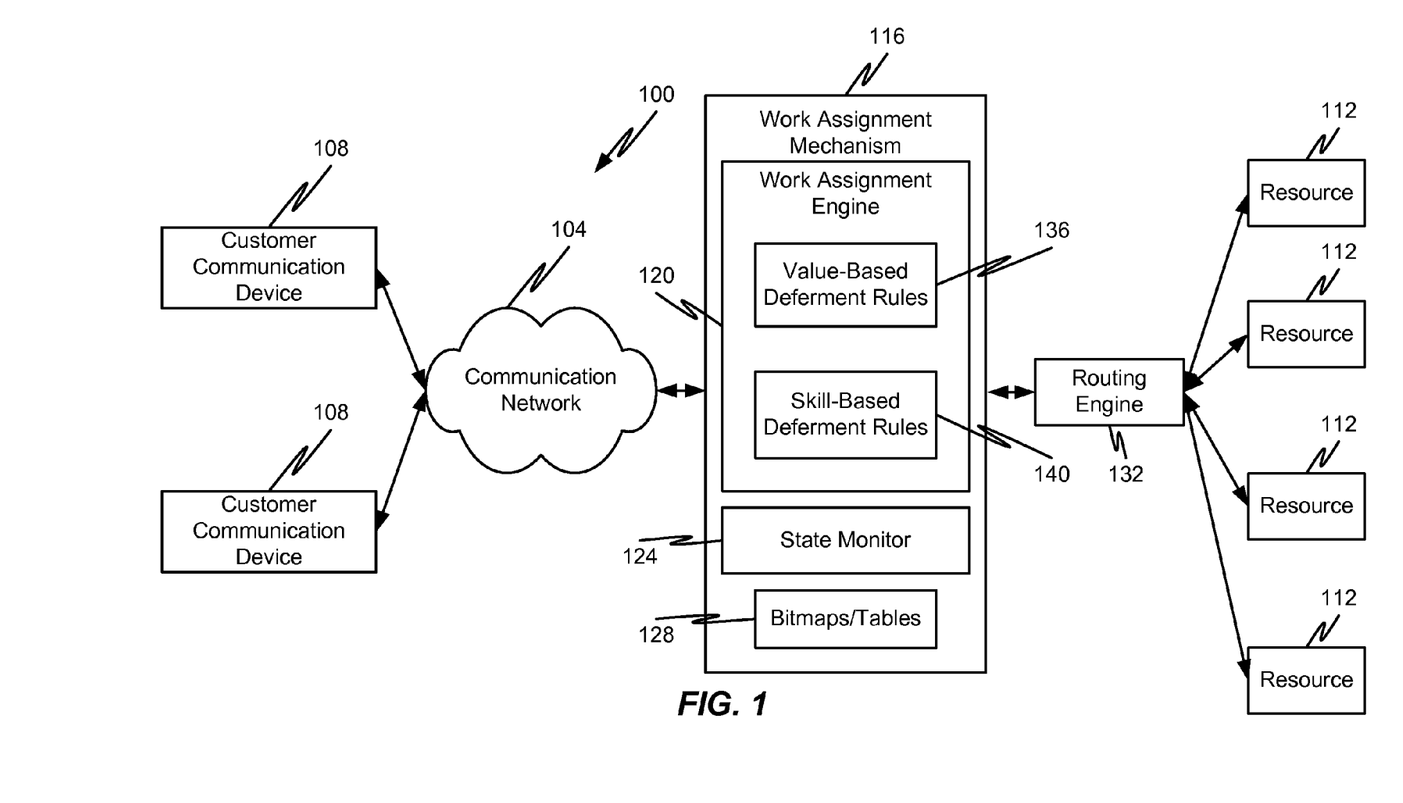
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering a contact center in which a plurality of resources 112 are distributed to handle work items (in the form of contacts) from the customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof.

In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and 12/707,277, filed Mar. 20, 1010, Feb. 17, 2010, and Feb. 17, 2010, respectively, each of which are hereby incorporated herein by reference in their entirety.

The format of the work item may depend upon the capabilities of the communication device 108 and the format of the communication. In some embodiments, work items are logical representations within a contact center of work to be performed in connection with servicing a communication received at the contact center (and more specifically the work assignment mechanism 116). The communication associated with a work item may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 132 to connect the communication device 108 which initiated the communication with the assigned resource 112. The connection between the customer communication device 108 and a resource 112 may be effected by the routing engine 132 assigning one or more communication resources (e.g., sockets, buffers, physical ports, etc.) to establish a communication path (e.g., media stream such as RTP or SRTP) between the communication device 108 and resource 112. In some embodiments, the communication path established between the communication device 108 and resource 112 may also carry call control signaling, however, it may also be possible to maintain the signaling path at the work assignment mechanism 116.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112 connected to the work assignment mechanism 116.

In some embodiments, the work assignment mechanism 116 comprises a work assignment engine 120 which enables the work assignment mechanism 116 to make intelligent routing decisions for work items. In some embodiments, the work assignment engine 120 is configured to administer and make work assignment decisions in a queueless contact center, as is described in U.S. patent application Ser. No. 12/882,950, the entire contents of which are hereby incorporated herein by reference.

More specifically, the work assignment engine 120 can generate bitmaps/tables 128 and determine, based on an analysis of the bitmaps/tables 128, which of the plurality of processing resources 112 is eligible and/or qualified to receive a work item and further determine which of the plurality of processing resources 112 is best suited to handle the processing needs of the work item. As will be discussed in further detail herein, the work assignment engine 120 may comprise one or more rule sets for making intelligent work item routing decisions, which in some embodiments may actually be a decision to defer a work item routing decision for a predetermined amount of time.

In situations of work item surplus, the work assignment engine 120 can also make the opposite determination (i.e., determine optimal assignment of a work item to a resource). In some embodiments, the work assignment engine 120 is configured to achieve true one-to-one matching by utilizing the bitmaps/tables 128 and any other similar type of data structure.

The work assignment engine 120 may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users.

In addition to comprising the work assignment engine 120, the work assignment mechanism 116 may also comprise a state monitor 124. The state monitor 124 may be configured to monitor and assess the state of the contact center 100 on a continual or periodic basis and provide results of its assessment to the work assignment engine 120. Specifically, the state monitor 124 may provide its analysis information to the work assignment engine 120 to assist the work assignment engine 120 in making work item routing decisions. In some embodiments, the input from the state monitor 124 may be used as inputs to the decision rules contained in the work assignment engine 120. More specifically, the work assignment engine 120 may comprise one or more value-based deferment rules 136 and/or one or more skill-based deferment rules 140. The variable or considerations of these deferment rules 136, 140 may include data received from the state monitor 124.

Specifically, the state monitor 124 may be responsible for monitoring one or more agent performance metrics (e.g., KPIs, schedule adherence, overall profitability, skill improvements, etc.) for some or all agents in the contact center 100 and comparing those metrics with one or more Service Level Objectives or SLOs. The results of these comparisons may be provided to work assignment engine 120 to assist in making work item routing decisions.

Information monitored by the state monitor 124 may include information which describes an agent's current or historical (e.g., past hour, day, week, month, quarter, year, recent work assignment history, etc.) performance within the contact center. In some embodiments, the state monitor 124 may provide KPI information that is obtained from the work assignment engine 120 or from some other analysis and reporting module running within the contact center. As used herein, KPIs may include, without limitation, any metric or combination of metrics that define performance of an entity within a contact center (e.g., a contact center agent, a group of contact center agents, etc.). Specifically, a KPI can be defined in terms of making progress toward strategic goals or simply the repeated achievement of some level of an operational goal.

In a contact center context, KPIs may vary depending upon whether work items correspond to outbound contacts (e.g., contacts originated by the contact center) or inbound contacts (e.g., contacts received at the contact center that have been originated outside the contact center). Non-limiting examples of outbound contact KPIs include: Contacts per hour—Average number of customers a call center agent was able to contact within an hour; Leads Conversion Rate—The percentage of leads that actually converted to sales; Hourly Sales—The average amount of sales the call center representative was able to close in an hour; Daily Sales—The average value of sales the agent was able to close in a day; and Accuracy—Extent to which a contact has been handled according to a predetermined script.

Non-limiting examples of inbound contact KPIs include: Real time Q—Metrics; Calls per hour—The average number of calls the agent is able to take per hour; Saves/One-Call Resolutions—The number of times our agents are able to resolve an issue immediately within the first phone call. Colloquially referred to as "one-and-done" calls; Average Handle Time—How long it takes for one call to be handled, which includes the call time itself, plus the work done after that call; Average Wait Time—How long a caller is put on hold before a call center agent becomes available to take the call; Accuracy; Abandonment Rate—This is the percentage of customers who disconnected before an agent was able to intercept the call; and Completion Rate—The ratio of successfully finished calls to the number of attempted calls by the customer.

Other types of KPIs that are not necessarily specific to inbound or outbound contacts include, without limitation, customer satisfaction level, customer service level, average speed of answer, contact forecast precision level, quality of services rendered, average handling cost of a contact, agent occupancy ratio, schedule adherence and conformity, and time distribution (in service, non-service detailed time or "shrinkage"). Other examples include number of times calls are put on hold, number of transfers, $/min, $/call, number of upsells, number of cross-sells, etc.

As can be appreciated, the state monitor 124 and/or bitmaps/tables 128 may be internal to the work assignment mechanism 116 or they may be separate from the work assignment mechanism 116. Likewise, certain components of the work assignment engine 120 (e.g., value-based deferment rules 136 and skill-based deferment rules 140) do not necessarily need to be executed within the work assignment engine 120 and may be executed in different parts of the contact center 100.

Figure 2:
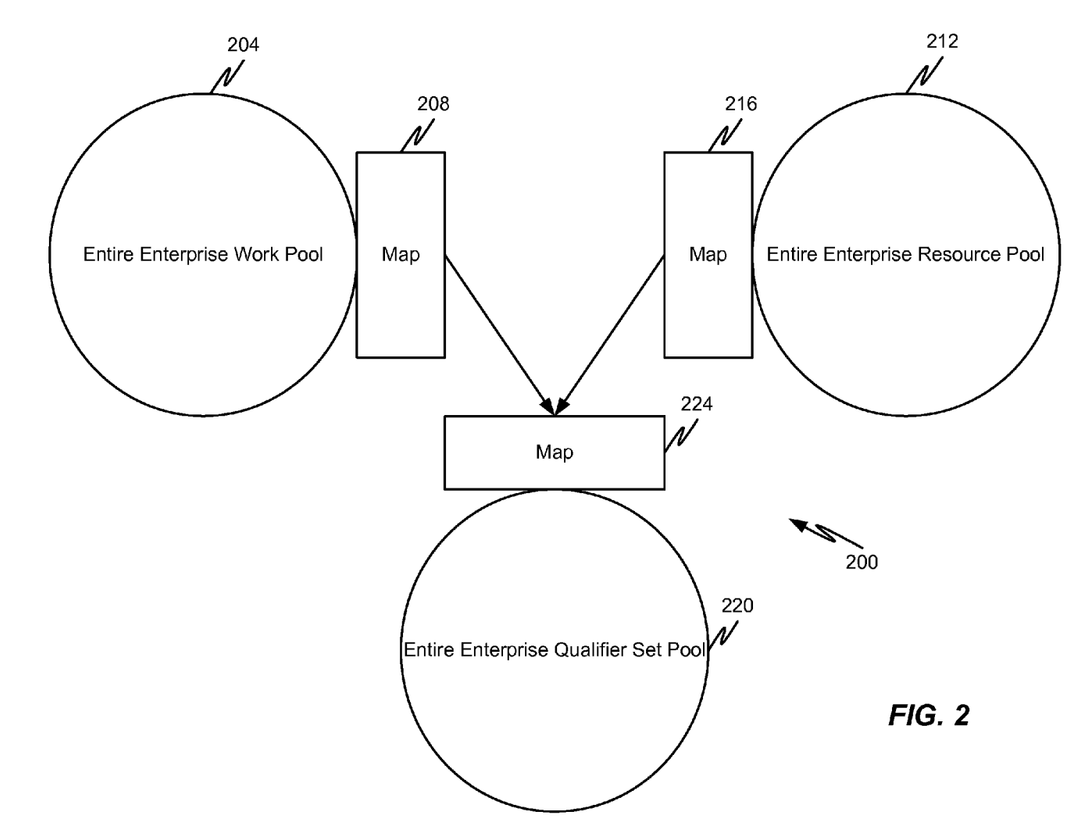
FIG. 2 is a block diagram depicting pools and bitmaps that are utilized in accordance with embodiments of the present disclosure.

FIG. 2 depicts exemplary data structures 200 which may be incorporated in or used to generate the bitmaps/tables 128 used by the work assignment engine 120. The exemplary data structures 200 include one or more pools of related items. In some embodiments, three pools of items are provided, including an enterprise work pool 204, an enterprise resource pool 212, and an enterprise qualifier set pool 220. The pools are generally an unordered collection of like items existing within the contact center. Thus, the enterprise work pool 204 comprises a data entry or data instance for each work item within the contact center 100 at any given time.

In some embodiments, the population of the work pool 204 may be limited to work items waiting for service by or assignment to a resource 112, but such a limitation does not necessarily need to be imposed. Rather, the work pool 204 may contain data instances for all work items in the contact center regardless of whether such work items are currently assigned and being serviced by a resource 112 or not. The differentiation between whether a work item is being serviced (i.e., is assigned to a resource 112) may simply be accounted for by altering a bit value in that work item's data instance. Alteration of such a bit value may result in the work item being disqualified for further assignment to another resource 112 unless and until that particular bit value is changed back to a value representing the fact that the work item is not assigned to a resource 112, thereby making that resource 112 eligible to receive another work item.

Similar to the work pool 204, the resource pool 212 comprises a data entry or data instance for each resource 112 within the contact center. Thus, resources 112 may be accounted for in the resource pool 212 even if the resource 112 is ineligible due to its unavailability because it is assigned to a work item or because a human agent is not logged-in. The ineligibility of a resource 112 may be reflected in one or more bit values. As discussed in further detail herein, the eligibility of a resource 112 may differ from the availability of that resource 112 to handle work as determined by the deferment rules 136, 140. Specifically, depending upon an agent's assigned tier according to one or more deferment rules 136, 140, an agent may actually be available to handle work items, but may be ineligible to handle work items of a particular type (e.g., skill requirement). The available but ineligible status of an agent may allow the deferment rules 136, 140 to actually defer work item routing decisions for a period of time, perhaps in the hope that a better qualified agent will become available and eligible in the meantime.

The qualifier set pool 220 comprises a data entry or data instance for each qualifier set within the contact center. In some embodiments, the qualifier sets within the contact center are determined based upon the attributes or attribute combinations of the work items in the work pool 204. Qualifier sets generally represent a specific combination of attributes for a work item. In particular, qualifier sets can represent the processing criteria for a work item and the specific combination of those criteria. Each qualifier set may have a corresponding qualifier set identified "qualifier set ID" which is used for mapping purposes. As an example, one work item may have attributes of language=French and intent=Service and this combination of attributes may be assigned a qualifier set ID of "12" whereas an attribute combination of language=English and intent=Sales has a qualifier set ID of "13." The qualifier set IDs and the corresponding attribute combinations for all qualifier sets in the contact center may be stored as data structures or data instances in the qualifier set pool 220.

In some embodiments, one, some, or all of the pools may have a corresponding bitmap. Thus, a contact center may have at any instance of time a work bitmap 208, a resource bitmap 216, and a qualifier set bitmap 224. In particular, these bitmaps may correspond to qualification bitmaps which have one bit for each entry. Thus, each work item in the work pool 204 would have a corresponding bit in the work bitmap 208, each resource 112 in the resource pool 212 would have a corresponding bit in the resource bitmap 216, and each qualifier set in the qualifier set pool 220 may have a corresponding bit in the qualifier set bitmap 224.

In some embodiments, the bitmaps are utilized to speed up complex scans of the pools and help each the work assignment engine make an optimal work item/resource assignment decision based on the current state of each pool. Accordingly, the values in the bitmaps 208, 216, 224 may be recalculated each time the state of a pool changes (e.g., when a work item surplus is detected, when a resource surplus is detected, etc.).

Figure 3:
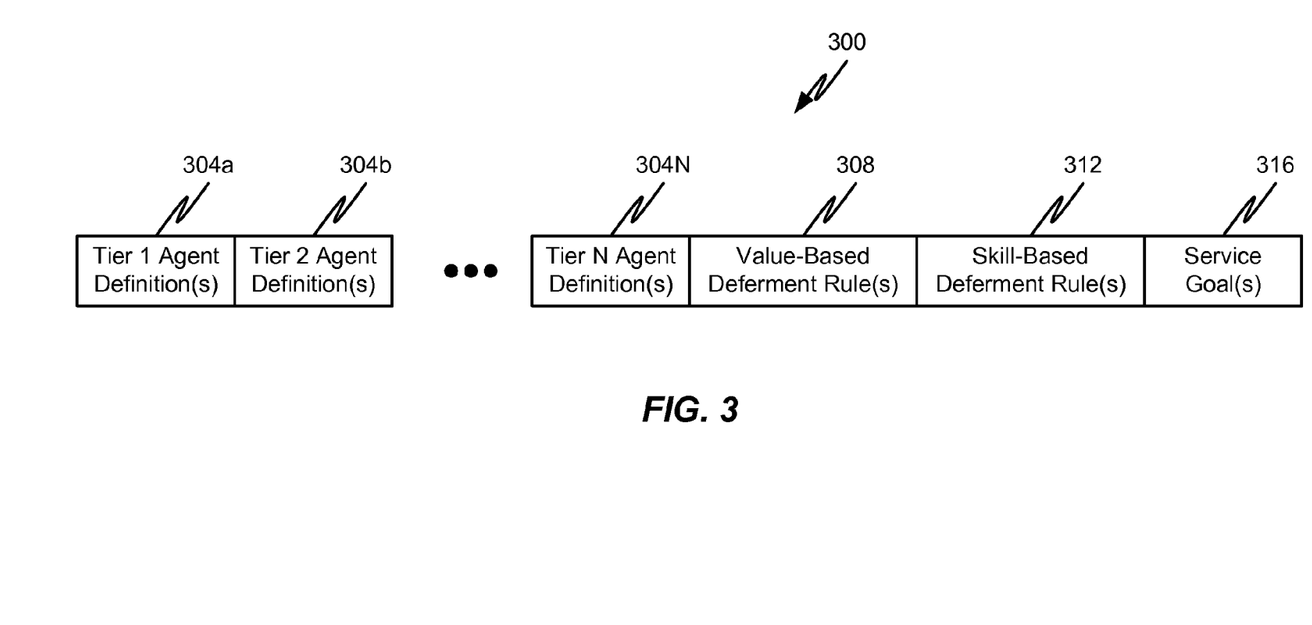
FIG. 3 is a block diagram depicting a data structure in accordance with embodiments of the present disclosure.

With reference now to FIG. 3, a data structure 300 that may be used by one or both sets of deferment rules 136, 140 will be described in accordance with embodiments of the present disclosure. The data structure 300 may comprise a number of data fields that enable the deferment rules 136, 140 to intelligently defer work item routing decisions based on the current state of the contact center 100. In some embodiments, the fields in the data structure 300 include a plurality of agent tier definition fields 304a-N, a value-based deferment rule field 308, a skill-based deferment rule 312, and a service goal(s) field 316.

As can be appreciated, the agent tier definition fields 304a-N along with the deferment rule fields 308, 312 may actually be integrated into the deferment rules 136, 140 as appropriate. The data structure 300 may also be separated or duplicated among each different deferment rules 136, 140 as appropriate. In other words, the value-based deferment rule 136 may comprise a first data structure that includes a first set of agent tier definition fields 304a-N, a value-based deferment rule field 308, and a service goal field 316. The skill-based deferment rule 140 may comprise a second data structure that includes a second set of agent tier definition fields 304a-N (different from the first set of agent tier definition fields), a skill-based deferment rule field 312, and a service goal field 316.

In some embodiments, the agent tier definition fields 304a-N may comprise rules for assigning agents to agent tiers and/or an association between each agent in the contact center and their assigned tier. For instance, the first agent tier definition field 304a may comprise a rule or definition for assigning a value of tier 1 to an agent. Alternatively, or in addition, the first agent tier definition field 304a may comprise a listing of agents in the contact center 100 that have been assigned a value of tier 1.

It should be appreciated that agents may be assigned multiple different tier values for each skill in contact center. More specifically, an agent may be assigned a value of tier 1 for work items of a first type (e.g., a first skill), but a value of tier 2 or tier 3 for work items of a second type (e.g., a second skill). Accordingly, there may be different tier assignment definitions for each skill within the contact center. This means that deferment rules may vary according to the skill requirements of a work item. A first work item having a first set of skill requirements (or single skill requirement) may have a first deferment rule applied thereto whereas a second work item having a second set of skill requirements (or single skill requirement) may have a second deferment rule applied thereto.

Further still, depending upon the state of the contact center, the work assignment engine 120 may elect to either apply a value-based deferment rule 136 or a skill-based deferment rule 140. As the state of the contact center changes, the work assignment engine 120 may switch between applying the different deferment rules 136, 140. In some embodiments, the decision to apply one deferment rule versus another deferment rule may depend upon whether and to what extent one or more service goals (also referred to as SLOs) as defined in the service goal field 316 are currently being met. As discussed above, a SLO is an objective for one or more pre-defined performance metrics that are currently being analyzed in the contact center 100 (perhaps by the state monitor 124).

If a particular SLO or set of SLOs are not being met, the work assignment engine 120 may decide to apply either the value-based deferment rule 136 or the skill-based deferment rule 140. If multiple SLOs are not being met and some dictate that one deferment rule should be applied and others dictate that the other deferment rule should be applied, the work assignment engine 120 may be provided with logic that selects which deferment rule 136, 140 should be applied in such a situation. The logic applied by the work assignment engine 120 in such a situation may be as simple as comparing the number of skill-related-SLOs being violated with the number of value-related-SLOs being violated and then selecting the appropriate deferment rule based on that comparison (e.g., if more skill-related-SLOs are being violated, then apply the skill-based deferment rule or if more value-related-SLOs are being violated, then apply the value-based deferment rule). Additional considerations may also be included in the selection analysis such as the relative importance to the contact center 100 of the SLOs being violated and to what extent the various SLOs are being violated.

Figure 4:
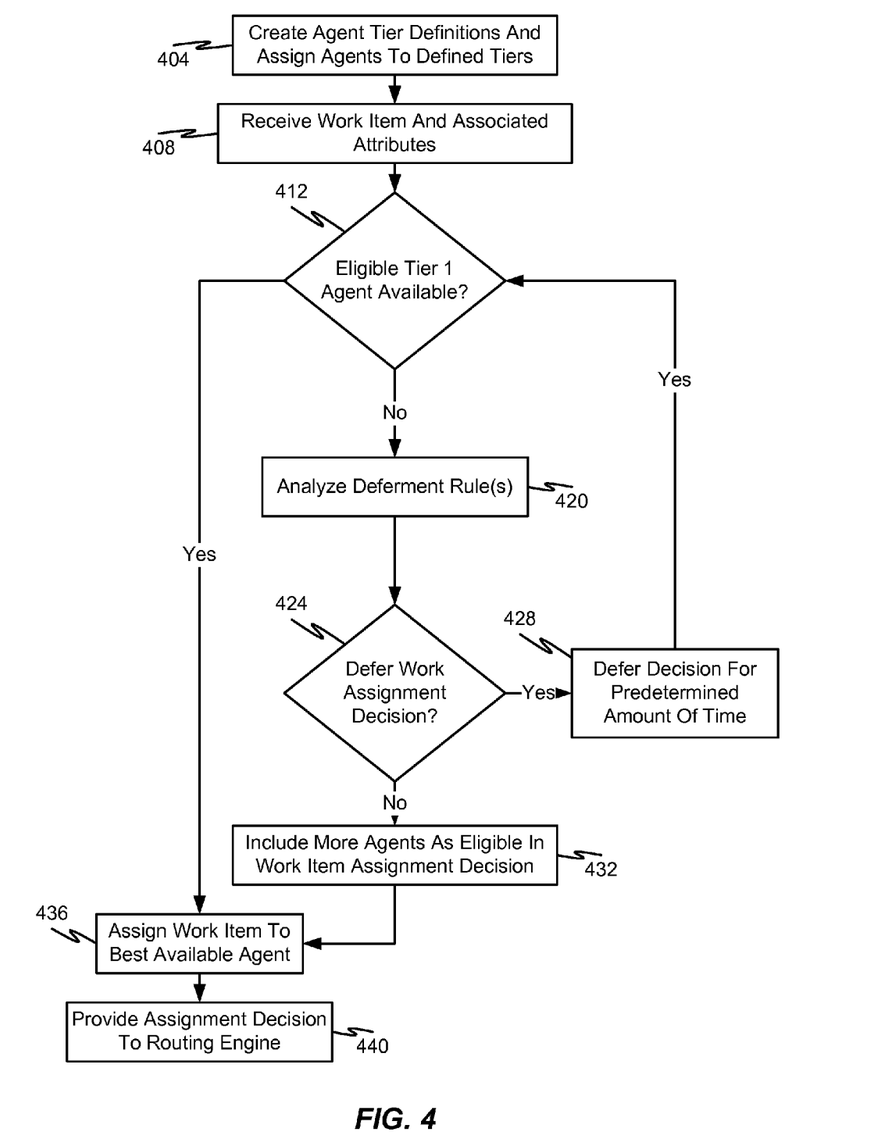
FIG. 4 is a flow diagram depicting a method of deferring work item routing decisions in accordance with embodiments of the present disclosure.

With reference now to FIG. 4, additional details related to the application of the deferment rules 136, 140 will be described in accordance with embodiments of the present disclosure. The method depicted and described herein will refer to a two-tiered structure. However, it should be appreciated that embodiments of the present disclosure are not so limited and the concepts described in connection with FIG. 4 may be applied to situations where more than two agent tiers are defined and/or situations where multiple different agent tiers are defined for different skills in the contact center 100. Furthermore, an agent may be assigned different tiers even for the same skill if the agent is highly efficient at handling work items for that skill, but is not particularly as good at extracting full value for the same work items. In this situation, the agent may be assigned a value of tier 1 if the skill-based deferment rules 140 are used to defer a routing decision, but the same agent may be assigned a value of tier 2 (or lower) if the value-based deferment rules 136 are used to defer a routing decision. Accordingly, an agent may be assigned a different tier for the same work item depending upon the state of the contact center 100.

The method begins with the creation of agent tier definitions and the assignment of such definitions to the agents in the contact center 100 (step 404). Specifically, each agent may be assigned a tier value for one or both of the value-based deferment rules 136 and skill-based deferment rules 140. Alternatively, the proficiency of an agent (e.g., skill-based proficiency and value-based proficiency) for every agent in the contact center may already be known and stored in a local database. The definition of tier definitions may simply involve defining a tier assignment rule that is applied to every agent in the contact center 100.

The method continues when a work item is received at the contact center 100 and the associated attributes of the work item (e.g., skill or processing requirements) (step 408). This particular step may occur when the work item is received at the work assignment engine 120. The attributes of the work item may be obtained using any known mechanisms such as obtaining information from a customer database, analyzing caller identification information, receiving information from an IVR interaction with the customer, etc.

After the attributes of the work item have been determined, the work assignment engine 120 continues by analyzing the resource pool 212 or the bitmap 216 associated therewith to determine whether any tier 1 agents are available (step 412). It should be appreciated that rather than referring to the bitmap 216, if a queue-based contact center is being employed, the work assignment engine 120 may assign the work item to the appropriate queue and determine if any tier 1 agents are currently available in the associated resource queue. As noted above, the analysis of whether a tier 1 agent is available may depend upon whether the work assignment engine 120 is currently applying a value-based deferment rule 136 or a skill-based deferment rule 140. The application of the value-based deferment rule 136 versus the skill-based deferment rule 140 may depend upon the current state of the contact center 100 as determined by information received from the state monitor 124.

If a tier 1 agent is available to handle the received work item, then the method continues with the work assignment engine 120 selecting the best agent from the available tier 1 agents and assigning the work item to the best agent (step 436). In some embodiments, the best agent determination may be made by analyzing one or more of the bitmaps 208, 216, 224. In a queue-based contact center, the selection of the best agent may be simplified in that the work assignment engine 120 may select the tier 1 agent that has been idle for the longest amount of time (e.g., the tier 1 agent has the highest queue position).

The work assignment engine 120 may provide the assignment information to the routing engine 132 to effect the work assignment decision (step 440). In particular, the routing engine 132 may establish a communication channel or communication session between the communication device 108 associated with the work item and the communication device of the selected tier 1 agent (e.g., the selected resource 112). The manner in which the communication channel or session is established may vary depending upon the nature of the work item/contact (e.g., whether the contact is a real-time or non-real-time contact).

Referring back to step 412, if no tier 1 agents are currently available for the work item, then the method continues with the work assignment engine 120 analyzing the appropriate deferment rule 136 or 140 to determine if the work item routing decision should be deferred for a predetermined amount of time or not (steps 420, 424). As discussed above, the deferment rule 136, 140 analyzed by the work assignment engine 120 may depend upon whether and to what extent certain SLOs are being met. Other considerations that control which deferment rule should be used include whether the contact center is in a state of emergency, whether the state monitor 124 is predicting that one or more SLOs will not be met in the future, and any other condition of the contact center that might result in or is currently resulting in a decrease in the contact center's performance.

If the analysis of the appropriate deferment rule dictates that the work assignment decision should be deferred for a predetermined amount of time, then the method proceeds to step 428 where the work assignment engine 120 will cause the assignment decision to be deferred for that particular work item. During the deferment period, the hope is that a tier 1 agent will become available and the amount of time that was lost due to deferment will be offset by assigning the work item to a tier 1 agent instead of assigning the work item to a tier 2 (or lower) agent. The amount of time that an assignment decision is deferred may depend upon the deferment rule definitions and the number of SLOs that are currently being violated. It should be appreciated that if a relatively small number of SLOs (or less important SLOs) are being violated, then the deferment period can be longer than if a larger number of SLOs (or more important SLOs) are being violated. The importance of SLOs may be defined by a contact center manager or administrator and can be based on business rules or other considerations.

After the predetermined amount of time has passed (e.g., the assignment decision has been deferred for a first deferment period), the method returns to step 412. If at step 424 it is determined that the work assignment decision should not be deferred (e.g., because the decision has already been deferred for the work item more than a predetermined number of times), the method proceeds with the work assignment engine 120 altering the eligibility of tier 2 agents (or lower tiers) to include more agents as eligible in the work assignment decision (step 432). The method is then depicted as proceeding to step 436 where a work assignment decision is made. However, it should be appreciated that if more than two tiers of agents are defined for the work item, then a second deferment period may be enforced after which additional tiers of agents may be switched from ineligible to eligible for handling the work item.

The work assignment decision made in step 436 after a deferment period has been enforced may be slightly different than if no deferment period has been enforced. Specifically, if during the deferment period a higher tier agent became available, then the work item can be assigned to the highest tiered or best agent. If no higher tier agent became available during the deferment period, then the work item can be assigned to the best suited available and eligible agent as dictated either by idle agent time (e.g., assign the work item to the agent that has been waiting the longest) or by analyzing the bitmaps 208, 216, 224. It should be appreciated that the selection of a "best" agent will depend upon whether the contact center 100 is queue-based or queueless.

Accordingly, it should be appreciated that while embodiments of the present disclosure have been described in connection with a queueless contact center architecture, embodiments of the present disclosure are not so limited. In particular, those skilled in the contact center arts will appreciate that some or all of the concepts described herein may be utilized in a queue-based contact center or any other traditional contact center architecture.

Furthermore, in the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail.

In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method performed by a processor, the method comprising:
   dividing a group of contact center agents into at least two tiers, the at least two tiers including a first tier and a second tier;
   receiving a work item at a first time, wherein agents from the group of contact center agents including both first and second tier agents are qualified to process the received work item;
   determining that no first tier agent is available to receive the work item at the first time; and
   deferring a work assignment decision for the work item regardless of whether or not a second tier agent is available to receive the work item at the first time, wherein the work assignment decision is deferred until a second time that is a predetermined amount of time after the first time, wherein agents in the first tier are predicted to complete processing of the work item within a first processing time, wherein agents in the second tier are predicted to complete processing of the work item within a second processing time, and wherein the second processing tune is greater than the first processing time by an amount that exceeds the predetermined amount of time.

2. The method of claim 1, the method further comprising:
   at or after the second time, changing a status of the second tier agents from ineligible to process the work item to eligible to process the work item; and
   at or after the second time and after the status of the second tier agents has been changed, making the work assignment decision for the work item, wherein the work assignment decision made at or after the second time includes all available first and second tier agents as eligible.

3. The method of claim 2, wherein at or after the second time no first tier agent is still available and wherein the work assignment decision causes the work item to be assigned to a second tier agent.

4. The method of claim 2, wherein at or after the second time a first tier agent is available and wherein the work assignment decision causes the work item to be assigned to the available first tier agent.

5. The method of claim 1, wherein agents in the first tier are predicted based on prior work history to obtain a first value when processing the work item, wherein agents in the second tier are predicted based on prior work history to obtain a second value when processing the work item, and wherein the first value is greater than the second value.

6. The method of claim 5, wherein the predetermined amount of time is computed based on a difference between the first value and second value.

7. The method of claim 1, wherein the work item corresponds to a real-time contact.

8. The method of claim 1, wherein a second tier agent that is qualified to process the work item is available at the first time, but the second tier agent is considered ineligible to process the work item at least until the second time.

9. A tangible and non-transitory computer readable medium having stored thereon instructions that cause a computing system to execute a method, the instructions comprising:
   instructions configured to divide a group of contact center agents into at least two tiers, the at least two tiers including a first tier and a second tier; and
   instructions configured to determine, at a first time, that a work assignment decision for a received work item should be deferred until a second time regardless of whether or not a second tier agent is available to process the work item at the first time because there are no first tier agents available to process the work item at the first time, wherein agents from the group of contact center agents including both first and second tier agents are qualified to process the received work item, and wherein the second time is a predetermined amount of time after the first time, wherein agents in the first tier are predicted to complete processing of the work item within a first processing time, wherein agents in the second tier are predicted to complete processing of the work item within a second processing time, and wherein the second processing time is greater than the first processing time by an amount that exceeds the predetermined amount of time.

10. The computer readable medium of claim 9, further comprising instructions configured to, at or after the second time, change a status of the second tier agents from ineligible to process the work item to eligible to process the work item and then make the work assignment decision for the work item, wherein the work assignment decision made at or after the second time includes all available first and second tier agents as eligible.

11. The computer readable medium of claim 10, wherein at or after the second time no first tier agent is still available and wherein the work assignment decision causes the work item to be assigned to a second tier agent.

12. The computer readable medium of claim 10, wherein at or after the second time a first tier agent is available and wherein the work assignment decision causes the work item to be assigned to the available first tier agent.

13. The computer readable medium of claim 9, wherein agents in the first tier are predicted based on prior work history to obtain a first value when processing the work item, wherein agents in the second tier are predicted based on prior work history to obtain a second value when processing the work item, and wherein the first value is greater than the second value.

14. The computer readable medium of claim 13, wherein the predetermined amount of time is computed based on a difference between the first value and second value.

15. A contact center, comprising:
a processor comprising a work assignment mechanism including:
a work assignment engine including at least one set of work assignment rules configured to divide a group of contact center agents into at least two tiers, the at least two tiers including a first tier and a second tier and, at a first time, determine that a work assignment decision for a received work item should be deferred until a second time regardless of whether or not a second tier agent is available to receive the work item at the first time because there are no first tier agents available to receive the work item at the first time, wherein agents from the group of contact center agents including both first and second tier agents are qualified to process the received work item, and wherein the second time is a predetermined amount of time after the first time, wherein agents in the first tier are predicted to complete processing of the work item within a first processing time, wherein agents in the second tier are predicted to complete processing of the work item within a second processing time, and wherein the second processing tune is greater than the first processing time by an amount that exceeds the predetermined amount of time.

16. The contact center of claim 15, wherein the at least one set of work assignment rules include a skill-based deferment rule set and a value-based deferment rule set.

17. The contact center of claim 16, further comprising a state monitor configured to determine a current state of the contact center and provide instructions to the work assignment engine that cause the work assignment engine to, based on the current state of the contact center, determine whether to use the skill-based deferment rule set or the value-base deferment rule set.

18. The contact center of claim 15, wherein a second tier agent that is qualified to process the work item is available at the first time, but the second tier agent is considered ineligible to process the work item at least until the second time.

* * * * *

UNITED STATES PATENT AND TRADEMARK OFFICE
CERTIFICATE OF CORRECTION

Page 1 of 1

PATENT NO.        : 8,634,541 B2
APPLICATION NO.   : 13/457253
DATED             : January 21, 2014
INVENTOR(S)       : Flockhart et al.

It is certified that error appears in the above-identified patent and that said Letters Patent is hereby corrected as shown below:

In the Claims

Column 16, line 12, Claim 15, please delete the "tune" and insert --time-- therein.

Signed and Sealed this
Sixteenth Day of September, 2014

Michelle K. Lee
*Deputy Director of the United States Patent and Trademark Office*